United States Patent [19]

Mori et al.

[11] Patent Number: 4,655,870

[45] Date of Patent: Apr. 7, 1987

[54] METHOD AND APPARATUS FOR GLUEING AND PREHEATING CORRUGATED BOARD

[75] Inventors: Kazuo Mori, Kyoto; Eiichi Isowa, Aichi, both of Japan

[73] Assignee: Isowa Industry Company, Ltd., Aichi, Japan

[21] Appl. No.: 703,488

[22] Filed: Feb. 20, 1985

[30] Foreign Application Priority Data

Feb. 20, 1984 [JP] Japan .................................. 59-30899

[51] Int. Cl.⁴ ........................ B32B 31/08; B32B 31/12; B32B 31/26

[52] U.S. Cl. .................................... 156/285; 156/208; 156/292; 156/322; 156/324; 156/382; 156/497; 156/499; 156/548; 156/549; 156/551; 156/578; 165/108; 165/109.1

[58] Field of Search ............... 156/205, 208, 285, 292, 156/322, 470, 497, 499, 551, 382, 548, 549, 578, 324; 165/108, 109

[56] References Cited

U.S. PATENT DOCUMENTS 2,384,676 9/1945 Hill ...................................... 156/205
2,577,856 12/1951 Nelson ................................ 165/108
2,610,037 9/1952 Arvins et al. ........................ 165/108
2,800,307 7/1957 Putney ............................... 165/108
3,349,755 10/1967 Miller ................................. 165/108
3,935,047 1/1976 Shinomura .......................... 156/324
4,419,173 12/1983 Auiyama et al. .................... 156/208
4,430,139 2/1984 Bauerstock .......................... 156/324

FOREIGN PATENT DOCUMENTS 502952 5/1954 Canada ................................ 156/205

*Primary Examiner*—Jerome Massie
*Attorney, Agent, or Firm*—Schwartz & Weinrieb

[57] ABSTRACT

Disclosed herein is a method for glueing corrugated board and an apparatus for carrying out the same, the method comprising: heating a starch glue to a predetermined temperature range by heat exchange; supplying the starch glue to a glue pan placed in a hot atmosphere of a heat-insulated space so as to maintain the glue in a heated state; feeding a corrugated core sheet and a liner into the heat-insulated space; applying the heated starch glue to ridge portions of the corrugated core sheet; and bonding together the corrugated core sheet and liner.

20 Claims, 6 Drawing Figures

METHOD AND APPARATUS FOR GLUEING AND PREHEATING CORRUGATED BOARD

BACKGROUND OF THE INVENTION

1. Field of the Invention:

This invention relates to a method and apparatus for glueing corrugated board, and more particularly to a method and apparatus for preheating starch glue to a predetermined temperature range prior to bonding a liner sheet to a corrugated core sheet in the production of single- or double-faced corrugated board or double-faced dual corrugated board, for the purpose of shortening the time which is required for heating the glue up to its gelling temperature, thereby improving the efficiency of corrugated board production and facilitating the gelation adhesion and heating equipment.

2. Description of the Prior Art:

The corrugator machines intended for single-faced corrugated board or double-faced dual corrugated board generally employ a starch glue for a glue applicator which applies the glue on ridges of flutes of a corrguated core sheet to which a liner or facing sheet is to be bonded. Such starch glue is normally in the form of a suspension of low viscosity which is (in the case of the Stein Hall method) composed of a mixture of a main part containing starch and water in appropriate proportions and a carrier part containing starch and caustic soda in suitable proportions. The starch glue is stored in a glue pan which constitutes part of the glue applicator, and applied in a suitable amount to the ridge portions of a corrugated core paper by means of an applicator roll. The corrugated sheet with the starch glue applied on the ridge portions of its flutes is bonded to a liner and then fed into a predetermined heating zone in which the applied glue is heated to a gelling temperature to develop its strong adhesive force. In this connection, the gelling temperature of the starch glue is about 60° C. (though such varies depending upon its composition), but the starch in the glue pan is maintained approximately at ambient temperature so that it needs to be heated up to its gelling temperature by the use of a heater in order to develop its inherent adhesive force to quarantee strong bond of the liner to the corrugated sheet. However, it is often the case that such a heater is extremely lengthy and has a drawback that it occupies a large space of a corrugator line.

For example, FIG. 1 schematically shows glue applicators and a double backer mechanism for producing double-faced dual corrugated board. A pair of single-faced corrugated board 10 and 12 produced respectively by single facers, which are located in upstream positions are preheated through preheaters 14 and 16 on the way to glue applicators 18 and 20 where glue is applied to the ridges of the respective corrugated core sheets. The back liner of the single-faced corrugated board 12 and a liner 24 which is fed through another preheater 22 are bonded to the ridges of the corrugations of the single-faced corrugated board 10 and 12, respectively, between guide rolls 26 which are located downstream of the glue applicators. Each one of the glue applicators 18 and 20 is provided with an applicator roll 28 and a doctor roll 30 in the usual manner, applying the starch glue 34 in the glue pan 32 to the ridges of the single-faced corrugated board through the applicator roll 28. As mentioned hereinbefore, the starch glue 34 in the glue pan 32 is approximately at the ambient temperature, so that it has to be heated to the gelling temperature to produce its adhesive force. For this purpose, it has been the conventional practice to provide a heater over a large distance along the corrugator line, including heat boxes 36, a ballast roll 38 and a belt 40. The heating boxes 36 are constituted by a hollow box of iron casting with thick walls, and heated by internally flowing steam to transmit heat to glued portions of a double-faced dual corrugated board which is passed along the surfaces of the heat boxes, thereby attaining adhesion through gelation of the glue which is applied on the ridge portions of the corrugated core paper. However, these days the corrugator lines are operated at high speeds, passing corrugated board at a high speed through a heating zone which is constituted by the heat boxes 36. This naturally necessitates to provide a very lengthy heating zone in order to heat the corrugated board up to the gelling temperature of th starch glue. In other words, the provision of a lengthy heating zone has been unavoidably required to comply with the demand for speed-up of operations. Thus, it has been a matter of great concern in the art to omit or minimize the heating zone which invariably occupies a large space in the conventional corrugation lines. Besides, the starch glue in the conventional glue applicators largely depends on the ambient temperature and therefore the corrugated board production efficiency is greatly influenced by variations in ambient temperature or by seasonal temperature variations. A difficulty is also encountered in that the corrugated sheets suffer from warping or other defects due to excessive heat transfer from the heat boxes 36 when the operational speed is slowed down.

SUMMARY OF THE INVENTION

In an attempt to solve the above-mentioned drawbacks or problems of the prior art glue applicators, the present inventor has conducted an extensive study and as a result found that it becomes possible to shorten to a consideration degree the heating time which is required for gelation of the starch glue after bonding a corrugated sheet and a liner together and at the same time to reduce the installation space of a heater, by preheating the starch glue in the glue applicator (more precisely the starch glue which is circulated between the glue applicator and a stock tank) to a predetermined temperature range.

It is therefore an object of the present invention to provide a glue applicator for corrugating machines, which can shorten the time for heating a corrugated board to a gelation temperature of a starch glue after bonding glued ridge portions of a corrugated sheet to a liner, thereby permitting one to reduce the space of the heating zone for economical use of space in a corrugated board manufacturing plant while enhancing the production efficiency of a corrugating machine.

According to the present invention, the foregoing objective is achieved by a method for glueing corrugated board, which method is characterized by heating a starch glue up to a predetermined temperature range by heat exchange; supplying the starch glue to a glue pan which is placed in a hot atmosphere in a heat-insulated space to maintain the glue in heated state; feeding a corrugated core sheet and a liner into the heat-insulated space; applying the heated starch glue on ridge portions of the corrugated core sheet; and bonding the corrugated core sheet and liner together.

According to another aspect of the present invention, there is provided a method for glueing corrugated board, which method is characterized by heating a starch glue up to a predetermined temperature range by heat exchange; supplying the starch glue to a glue pan which is placed in a hot atmosphere in a heat-insulated space to maintain the glue in heated state; feeding a corrugated core sheet and a liner into the heat-insulated space; applying the heated starch glue on ridge portions of the corrugated core sheet; and quickly heating the starch glue on the ridge portions of the corrugated core sheet by blasting hot saturated steam thereagainst immediately before bonding together the corrugated core sheet and liner.

According to the invention, there is also provided an apparatus for carrying out the above-described method, namely, an apparatus for glueing corrugated board, including a preheating mechanism for preliminarily heating a corrugated core sheet and a liner to be bonded together, and a glue applicator for applying a starch glue in a glue pan on ridge portions of the preheated corrugated core sheet by means of an applicator roll, characterized in that the apparatus comprises in combination: a glue heater communicating with the glue pan and adapted to heat a starch glue from a stock tank up to a predetermined temperature range; and a casing forming a substantially closed, heat-insulated space around the preheating mechanism and glue applicator.

According to another aspect of the invention, the corrugated board glueing apparatus is charaacterized by the provision of a glue heater communicating with the glue pan and adapted to heat a starch glue from a stock tank up to a predetermined temperature range; a casing forming a substantially closed, heat-insulated space around the preheating mechanism and glue applicator, and a saturated steam blow pipe located immediately upstream of a position where the corrugated core sheet and liner are bonded together and having a multiple of steam blow holes each directed to the ridge portions of the corrugated core sheet.

BRIEF DESCRIPTION OF THE DRAWINGS

The above and other objects, features and advantages of the invention will become apparent from the following description and appended claims, taken in conjunctionn with the accompanying drawings which show by way of example some preferred embodiments of the invention, wherein:

DESCRIPTION OF PREFERRED EMBODIMENTS

Figure 1:
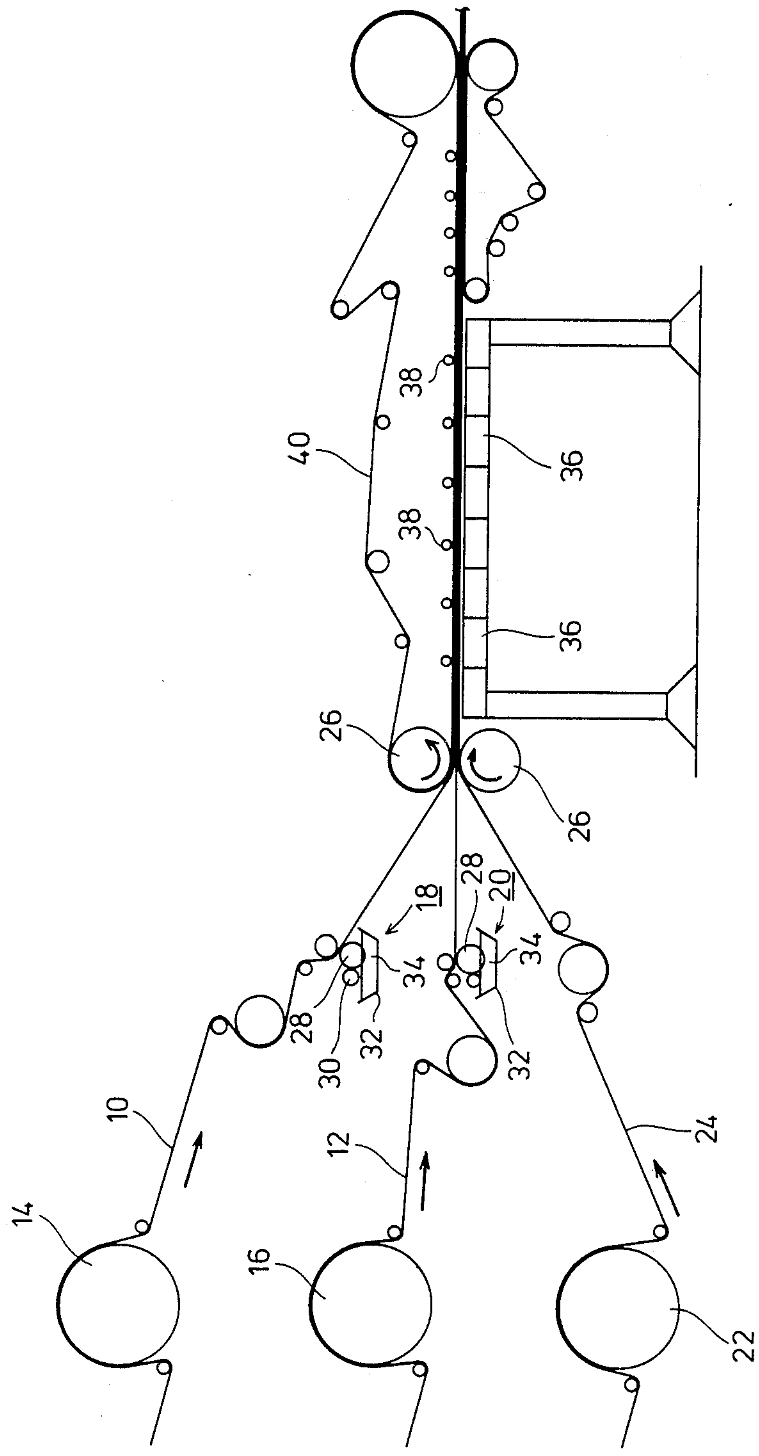
FIG.1 PRIOR ART
FIG. 1 is a schematic view of glue applicators and heat boxes for heating bonded corrugated sheet and liner in a conventional corrugation line.

Hereafter, the method and apparatus for glueing corrugated board according to the invention are described more particularly by way of preferred embodiments shown in the drawings.

Figure 2:
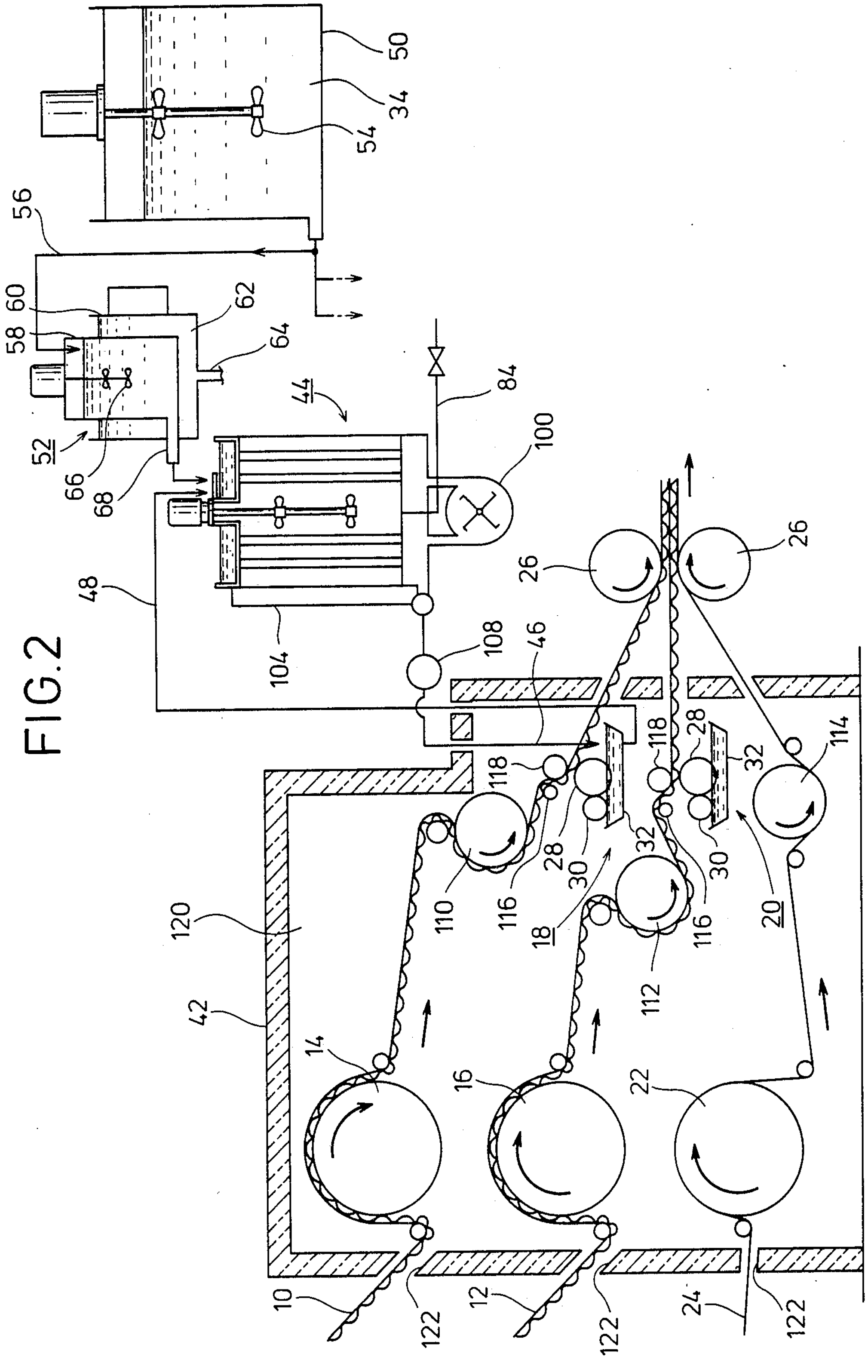
FIG. 2 is a schematic view of a corrugated board glueing machine suitable for carrying out the method of the present invention.

Referring to FIG. 2, there is schematically shown a corrugated board glueing machine embodying the invention, which is suitable for use as a glue machine in the production of double-faced dual corrugated board as shown in FIG. 1 and also as a glue machine in the production of single-faced corrugated board by a single facer or in the production of double-faced corrugated board. In FIG. 2, those parts which are common to FIG. 1 are designated by the same reference numerals for the sake of convenience.

As seen in FIG. 2, a preheating mechanism including the afore-mentioned preheaters and a glueing mechanism 18 are housed in a substantially closed heat-insulating casing 42 in the manner as will be described in detail hereinlater. A glue pan 32 of the glue applicator 18 is in communication with a glue heater 44 which serves to heat up a starch glue to a predetermined temperature range (as will be exemplified hereinlater), through a glue feed pipe 46 and a glue return pipe 48. The glue heater 44 is in communication with a tank 50 which holds a stock of the starch glue and which supplies the glue to the heater 44, through a subtank 52 in the particular embodiment shown, which is interposed between the stock tank 50 and heater 44 for operation as follows.

In the particular embodiment shown in FIG. 2, the stock tank 50 holds a stock of the starch glue consisting of main and carrier parts containing starch, water and caustic soda in appropriate proportions as mentioned hereinbefore. The glue stock is stirred and constantly maintained in uniform concentration by an agitator 54 which is provided in the stock tank 50. A pipe 56 which extends out from the bottom of the stock tank 50 is in communication with an inner tank 58 of the subtank 52. The pipe 56 is also connected to a plural number of similar subtanks although not shown. The subtank 52 has a double-tank construction consisting of an outer tank 60 and an inner tank 58 which is located in the outer tank 60 at a predetermined spaced distance therefrom. The outer tank 60 holds a liquid heat medium such as water 62 to a predetermined level. A steam feed pipe 64 which is in communication with a steam source, not shown, is connected to the bottom of the outer tank 60 so as to blow saturated steam into water 62 for raising the water temperature to a level of, for example, 45° C.±2° C. The inner tank 58 receives the starch glue 34 from the stock tank 50 and holds it to a predetermined level, the glue being uniformly stirred by an agitator 66. The starch glue 34 in the inner tank 58 is maintained at a temperature of 40° C.+2° C. to 40° C.−2° C. through heat exchange with heated water in the outer tank 60. The warmed glue 34 is supplied to the heater 44 which will be described hereinlater, through a pipe 68 which is connected to the bottom of the inner tank 58.

Figure 3:
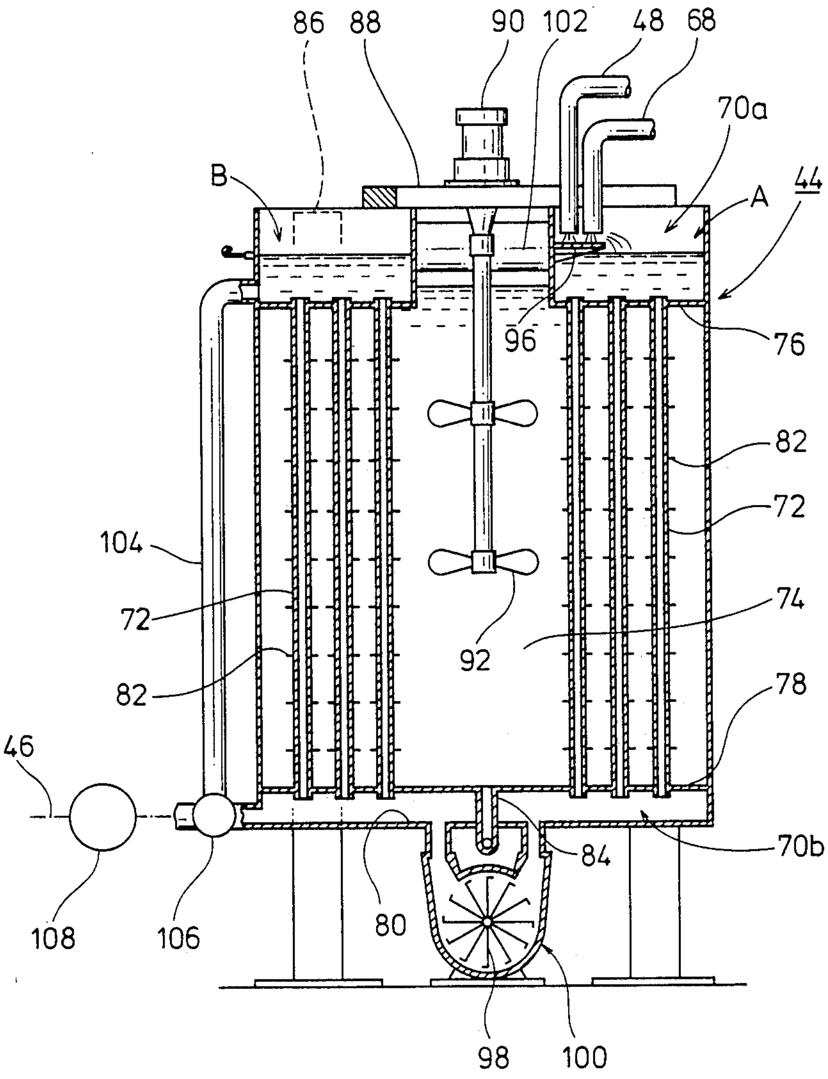
FIG. 3 is a schematic sectional view of a glue heater constituting a major component of the glue applicator according to the invention.
Figure 4:
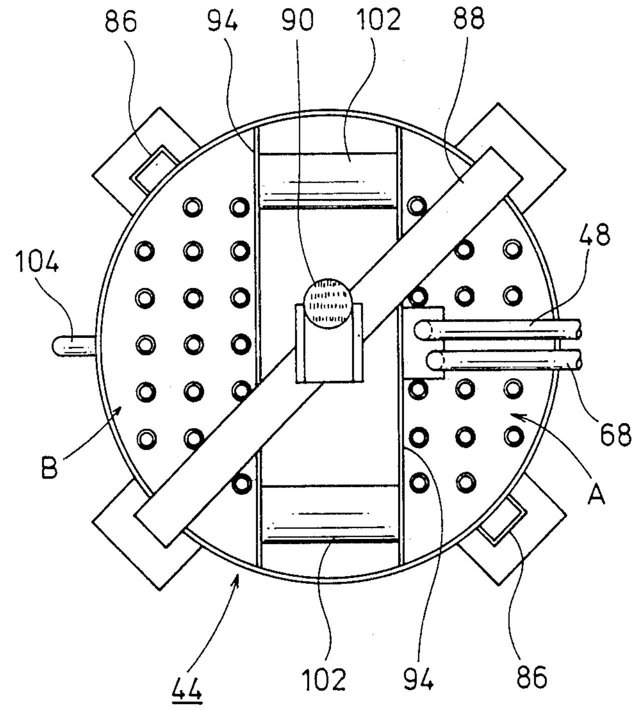
FIG. 4 is a schematic plan view of the glue heater shown in FIG. 3.

For details of the heater 44, reference is had to its vertical section and plan view of FIGS. 3 and 4. More particularly, the heater 44 is constituted by a cylindrical tank of a predetermined diameter which basically includes a pooling chamber **70*a* which receives the supply of the starch glue 34 from the subtank 52 (or from the stock tank 50 in the case where the subtank is omitted), a multitude of heat exchange pipes 72** which are connected to the pooling chamber 70*b* to permit passage therethrough of the starch glue 34, and a heat medium chamber 74 which circumvents the heat exchange pipes 72 through a heat medium such as water.

For example, the tank 44 is divided by a pair of horizontal partition plates 76 and 78 in the vicinity of its top and bottom portions, defining an upper pooling chamber 70*a* on the upper side of the upper partition plate 76 and a lower pooling chamber 70*b*between the lower partition plate 78 and the bottom wall 80 of the tank. A heat medium chamber 74 with a predetermined space is defined between the upper and lower partition plates 76 and 78. The upper pooling chamber 70*a* (with an open top) and the lower pooling chamber 70*b* are communication with each other by a number of vertically disposed heat exchange pipes 72 as shown in FIG. 3, the heat exchange pipes 72 being inserted in the heat medium chamber 74 and constantly held in contact with the heat medium (for example, heated water). Preferably, the heat exchange pipes 72 are copper pipes with fins 82 at suitable intervals on the outer peripheries thereof.

One end of a steam feed pipe 84 which is connected to a steam source, not shown, at the other end opens into the heat medium chamber 74 substantially at the center of its bottom portion, forcibly blowing saturated steam into the heat medium to raise its temperature to a range of, for example, 52° C.+4° C. to 52° C.−4° C. As shown particularly in FIG. 4, the center of the top wall of the heat medium chamber 74 is open to the air to release gaseous components of the blown-in steam. A support member 88 is bridged between upright posts 86 which support the load of the tank 44, and a motor 90 which is mounted on the support member 88 is connected to an agitator 92. This agitator 92 is inserted into the heat medium chamber 74 through the afore-mentioned top opening so as to uniformly stir the heat medium.

As is clear from FIGS. 3 and 4, the upper pooling chamber 70*a* is divided into two sections A and B by upright partition walls 94 which are connected by reinforcing members 102. As seen in FIG. 3, a horizontally extending diffuser plate 96 is fixedly mounted on the upright wall 94 in section A. Disposed over the diffuser plate 96 are the open ends of the glue feed pipe 68 from the inner tank 58 and the glue return pipe 48 from the glue pan 32. Namely, the starch glue from the subtank 52 and glue pan 32 is poured into the section A, and uniformly distributed over the section A by the diffuser plate 96.

A rotary pump 100 with an impeller 98 is provided at the bottom of the lower pooling chamber 70*b* as shown in FIG. 3 so as to forcibly and positively circulate the starch glue in the pooling chamber 70*a*, heat exchange pipes 72 and lower pooling chamber 70*b*. Namely, upon driving the rotary pump 100, the starch glue 34 supplied to the section A of the upper pooling chamber 70*a* is urged into the lower pooling chamber 70*b* through the heat exchange pipes 72 on the right side in the drawing, and then caused to climb up through the heat exchange pipes 72 on the left side so as to enter the section B of the upper pooling chamber 70*a*. While being passed through the heat exchange pipes 72, the starch glue is heated by the heat medium to a temperature of, for instance, 49° C.+2° C. to 49° C.−2° C., and part of the glue is sent to the pipe 46 leading to the glue pan 32, through an overflow pipe 104 and 3-way valve 106. The glue pan 32 is provided with a glue return pipe 48 as described hereinbefore to circulate the glue to the section A of the upper pooling chamber 70*a* of the heater 44.

The description is now directed to the details of the casing which closes the preheating and glue applicator mechanisms for effective use of waste heat. In the glue applicator mechanism shown in FIG. 2, a couple of single-faced corrugated board 10 and 12 transferred through separated paths from single-facers, which are located in upstream positions, are preheated by the preheaters 14 and 16, respectively, while a liner 24 is preheated by a different preheater 22. These three preheaters 14, 16 and 22 of the preheating mechanism are in the form of drum-like rollers which are heated to a predetermined temperature by internally flowing hot steam, and are respectively journalled at the opposite ends in parallel fashion for rotation in synchronism with each other. Accordingly, waste heat of high temperature is released around the preheaters during operation of the corrugator machine.

Auxiliary heater rolls 110 and 112 are rotatably supported in positions downstream of the preheaters 14 and 16, respectively, and glue applicators 18 and 20 are located downstream of the auxiliary heater rolls. Rotatably supported in a position downstream of the preheater 22 is another auxiliary heater roll 114 which is held in contact with the moving liner 24 for heating the same to a temperature suitable for adhesion to the ridge portions of the corrugated core sheet.

The above-mentioned glue applicators 18 and 20 are arranged in the same manner, and each includes a glue pan 32 for holding starch glue 34 to a predetermined level, an applicator roll 28 for transferring the starch in the glue pan to the ridge portions of a single-faced corrugated board, and a doctor roll 30 for controlling the thickness of the starch glue transferred onto the applicator roll.

A guide roll 116 for guiding the single-faced corrugated board and liner is located downstream of each one of the auxiliary heater rolls (which constitute part of the preheating mechanism). Located over the applicator roll 28 at a position spaced from the applicator roll 28 by a predetermined distance is a rider roll 118 which presses the back liner of the single-faced corrugated board for smooth transfer of the starch glue onto the ridge portions of the corrugated core sheet.

The preheaters and auxiliary heating rolls which constitute the preheating mechanism and the glue applicator mechanism are enclosed in a substantially sealed heat insulating chamber 120 which is provided in the casing 42. This casing 42 is, for example, a box formed of metallic sheets and lined with a heat insulating material such as glass wool. As shown in FIG. 2, slit-like openings 122 are formed at suitable positions in the side wall of the casing 42 for passing the single-faced corrugated board 10 and 12 and the liner 24.

Figure 5:
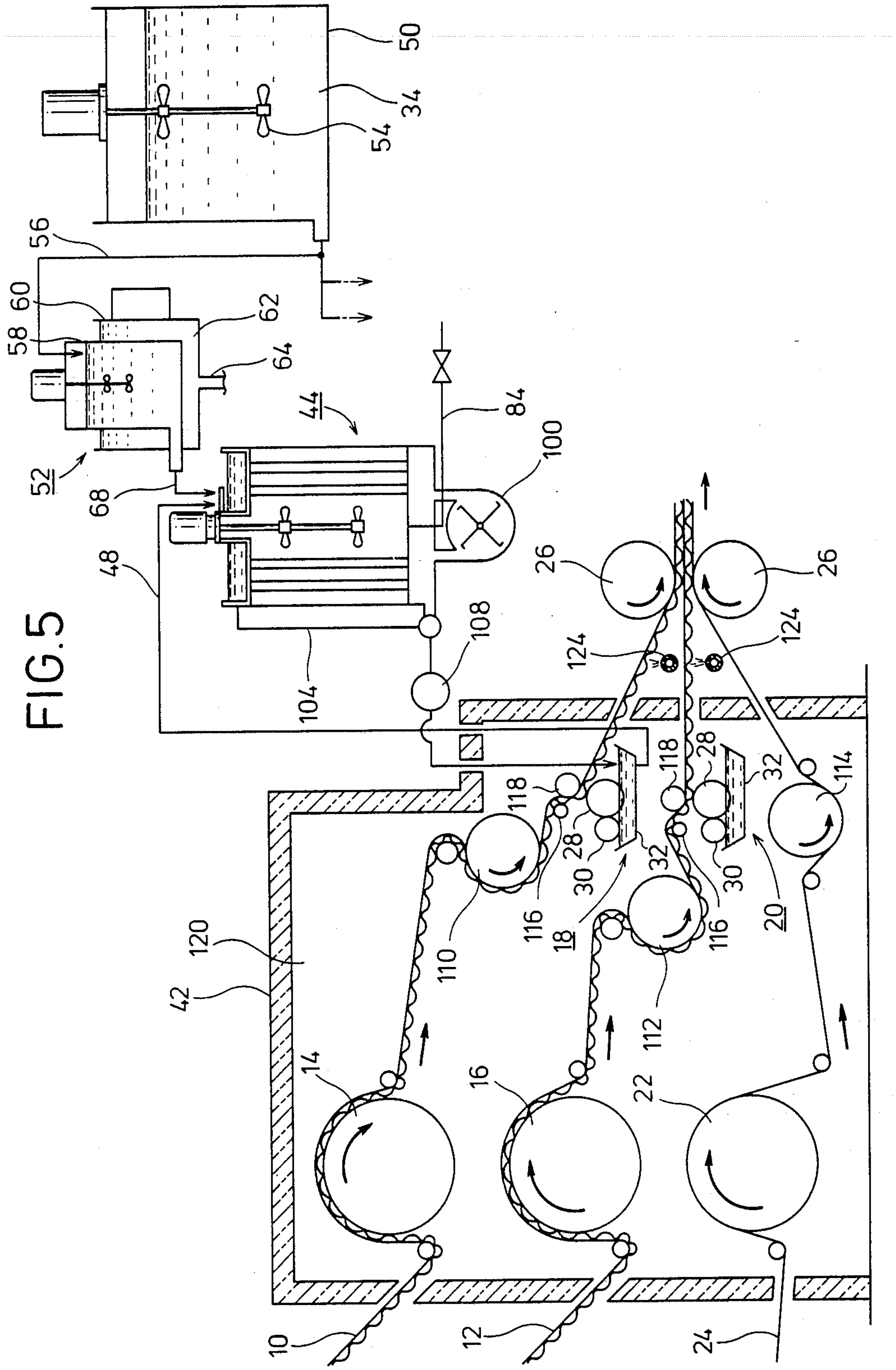
FIG. 5 is a view similar to FIG. 2 but showing another embodiment of the invention.
Figure 6:
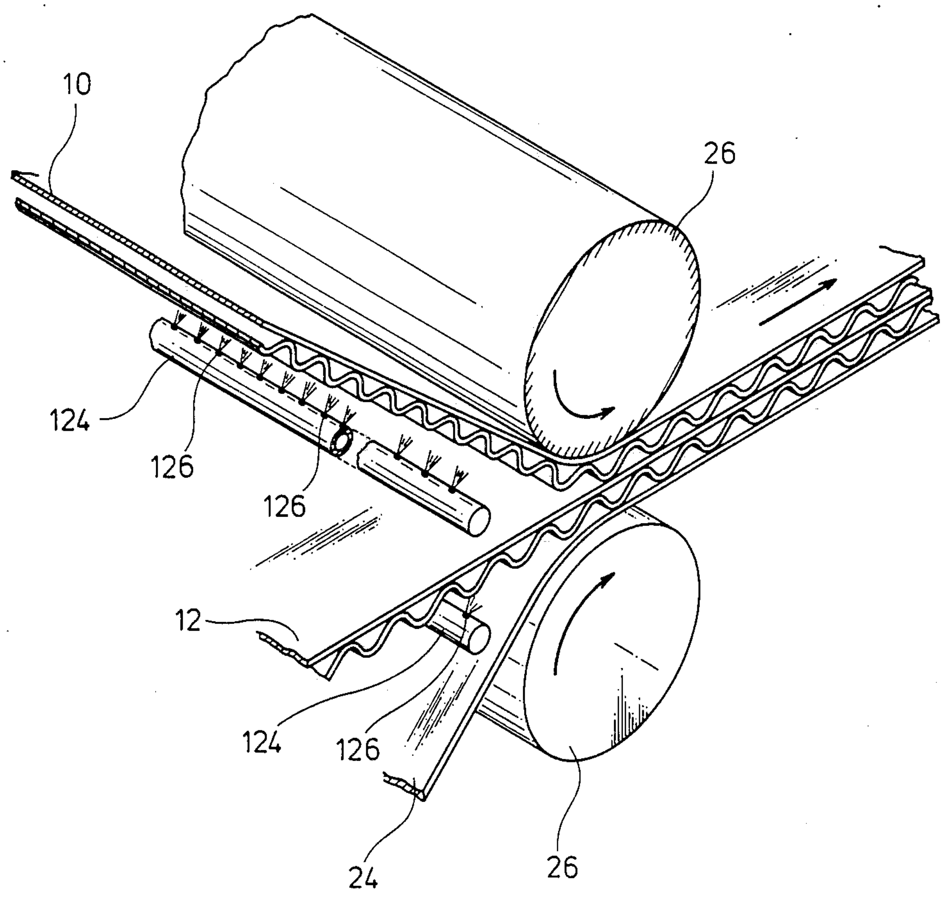
FIG. 6 is a fragmentary perspective view of a mechanism for blowing saturated steam on ridge portions to which a starch glue has been applied, for heating the glue in an accelerated manner.

Referring to FIGS. 5 and 6, there is shown another embodiment of the invention, the essential parts of which is common with the embodiment of FIGS. 2 to 4 and which is directed to the same purpose. Upon comparing FIG. 5 with FIG. 2, it will be seen that the two embodiments have in common the glue heater and the heat insulating casing. The embodiment of FIG. 5 differs in that a steam blowing means is provided at a position upstream of the guide rolls 26 as illustrated in FIG. 6 for further accelerating heat-up of the starch glue applied on the ridge portions of the corrugated core sheet. More particularly, the steam blowing means consists of steam blow pipes 124 which are located immediately upstream of the guide rolls 26 between which the single-faced corrugated board 10 and 12 are bonded to each other and to the liner 24, to accelerate heating of the starch glue on the ridge portions of the respective corrugated board. For this purpose, each steam blow pipe 124 is provided with a row of steam blow holes 126 along the length thereof, which are directed toward the ridge portions of the corrugated board. Hot saturated steam which is blown out under pressure from the steam blow holes 126 is blasted against the starch glue on the ridge portions of the fluted core sheet, quickly elevating the temperature of the glue so that it will reach the gelation temperature in a shortened time period in the succeeding heating zone.

Although not shown in FIGS. 2 and 5, it is preferred to provide an air circulating fan in the heat insulating chamber 120 of the casing 42 to distribute heated air to every part of the chamber. The glue heater with the above-described constructed according to the invention operates in the manner as follows. As shown particularly in FIG. 2, the starch glue 34 which is stored in the stock tank 50 is conducted into the inner tank 58 of the subtank 52 in the particular embodiments shown, and warmed up to a temperature of 40° C.+2° C. to 40° C.−2° C. by heated water or other heat medium in the outer tank 60 prior to the supply of the glue to the section A of the upper pooling chamber 70*a* of the glue heater 44 through the pipe 68. At this time, the heat medium, for example, heated water which is filled around the heat exchange pipes 72 in the heat medium chamber 74 is heated up to a temperature of 52° C.+4° C. to 52° C.−4° C. by saturated steam which is forcibly blown into the heat medium through the steam feed pipe 84. The starch glue 34 which is held in the section A of the upper pooling chamber 70*a* is circualted into the lower pooling chamber 70*b* through the heat exchange pipes 72 and then to the section B of the upper pooling chamber 70*a* through other heat exchange pipes 72 by operation of the pump 100. In the course, the starch glue 34 is heated to a temperature of about 49° C.+2° C. to 49° C.−2° C. (a temperature immediately before gelation of the starch glue) by heat exchange, and part of the heated glue is sent to the pipe 46 through the overflow pipe 104 by the glue feed pump 108 for supply to the glue pan 32 of the glue applicator.

The starch glue 34 which is supplied to the glue pan 32 of the glue applicator in this manner is heated during passage through the heater 44 to a temperature range which is approximately 10° C. lower than its gelling temperature, for example, to a temperature range of 49° C.+2° C. to 49° C.−2° C. Accordingly, when the glue is applied to the ridge portions of the respective single-faced corrugated board by the applicator rolls 28, it is already heated up to a relatively high temperature. It follows that, after bonding together the single-faced corrugated board and a back liner (liner 24) through the guide rolls 26, slight heating suffices to heat up the starch glue to its gelling temperature to produce its adhesive force. In addition, the corrugated board glueing machine according to the invention employs a plural number of heat sources including preheaters 14, 16 and 22 and auxiliary heating rollers 110 to 114 (which are maintained at a predetermined temperature by internally flowing hot saturated steam) within a closed space of the heat insulating chamber which is defined in the casing 42, so that the temperature in the heat insulating chamber is maintained at a high level during operation of the glue applicator by the waste heat of high temperature released from the above-mentioned heat sources. Therefore, the starch glue which is held in the glue pan 32 after heat-up through the glue heater 44 is maintained in the heated state in the hot atmosphere of the heat insulated chamber. Namely, it sufficies to apply heat of a relatively small calorific value to the bonded corrugated board by the heat boxes 36 in the heating zone, and the length of the heating zone can be reduced to a considerable degree as compared with the conventional counterpart which occupies a large space. Further, even if the operational speed of the corrugator line is slowed down, there is less possibility of the corrugated board suffering from warping or other defects due to overheating.

In a case where a steam blowing means is provided in the sheet bonding region as illustrated in FIGS. 5 and 6, the time for heating the starch glue up to the gelation temperature can be further shortened. Namely, the temperature of the starch glue which is applied on the ridge portions of the corrugated core sheets in its preheated state can be raised quickly by blowing thereagainst hot saturate steam from the steam pipes 124 immediately before bonding the corrugated sheets and liner together (while preventing the temperature of the starch glue from dropping by contact with cold air which would otherwise take place unless shielded by the heat insulating chamber). Thereafter, the single-faced corrugated board 10 and 12 and liner 24 are bonded together between the guide rolls 26.

As is clear from the foregoing description, the present invention makes it possible to shorten the length of the heating zone constituted by heat boxes 36 which is located downstream of a sheet bonding station when bonding double-faced dual corrugated board as shown in FIGS. 2 and 5. In addition, the time for heating the starch glue up to its gelation temperature can be shortened to a considerable degree, permitting one to bond the sheets more quickly and to speed up the operation of the corrugator machine as a whole so as to thereby improve the efficiency of the corrugated board production all the more. Further, since the sheet preheating and glueing mechanisms are shielded in a heat-insulated space in a casing, the temperature of the starch glue from the glue heater 44 can be maintained in heated state, by effective use of radiant heat from the preheating mechanism, which has thus far been wasted away. Needless to say, this greatly contributes to the economical use of energy.

The corrugated board glueing machine according to the invention can also be applied to the production of corrugated board by a single facer as mentioned hereinbefore. In such a case, mechanical operating parts of the single facer or glue machine may be totally covered by the heat-insulating casing to shield off operational noises or scattering paper dust for improvement of the working environment.

Obviously, many modifications and variations of the present invention are possible in light of the above teachings. It is therefore to be understood that within the scope of the appended claims, the present invention may be practiced otherwise than as specifically described herein.

What is claimed is:

1. A method for glueing corrugated board, comprising the steps of:

providing a closed, heat-insulating chamber;

heating a glue to a predetermined temperature;

disposing a glue pan within said heat-insulating chamber;

supplying said heated glue to said glue pan disposed within said heat-insulated chamber;

feeding a corrugated core sheet and a liner into said heat-insulated chamber;

providing preheater devices, within said heat-insulating chamber at predetermined locations along the feed path of said corrugated core sheet and said liner, for pre-heating said corrugated core sheet and said liner, and for generating waste heat which serves as the sole source of heat within said heat-insulated chamber for heating the interior space of said heat-insulated chamber to a predetermined temperature so as to maintain said corrugated core sheet and said liner, as well as said heated glue disposed within said glue pan, in a heated state;

applying said heated glue to ridge portions of said corrugated core sheet; and bonding together said corrugated core sheet and said liner at a location which is disposed outside and immediately downstream of said heat-insulated chamber.

2. A method for glueing corrugated board, comprising the steps of:

providing a closed, heat-insulating chamber;

heating a glue to a predetermined temperature;

disposing a glue pan within said heat-insulating chamber;

supplying said heated glue to said glue pan disposed within said heat-insulated chamber;

feeding a corrugated core sheet and a liner into said heat-insulated chamber;

providing preheater devices, within said heat-insulating chamber at predetermined locations along the feed path of said corrugated core sheet and said liner, for pre-heating said corrugated core sheet and said liner, and for generating waste heat which serves as the sole source of heat within said heat-insulating chamber for heating the interior space of said heat-insulating chamber to a predetermined temperature so as to maintain said corrugated core sheet and said liner, as well as said heated glue disposed within said glue pan, in a heated state;

applying said heated glue to ridge portions of said corrugated core sheet;

quickly heating said glue on said ridge portions of said corrugated core sheet by blasting hot steam thereagainst at a location which is disposed outside and immediately downstream of said heat-insulating chamber; and bonding together said corrugated core sheet and said liner at a location immediately downstream of said hot steam blasting location.

3. A method as set forth in claim 1, wherein:

said preheater devices are steam-heated rollers.

4. A method as set forth in claim 1, further comprising the steps of:

supplying said heated glue to said glue pan from a heat exchanger; and recirculating said heated glue from said glue pan back to said heat exchanger.

5. A method as set forth in claim 3, further comprising:

disposing said preheater rollers in contact with said corrugated core sheet and said liner for heating the same by contact therewith, said heater roller for said corrugated core sheet being disposed upstream of said glue pan.

6. A method as set forth in claim 2, wherein:

said preheater devices are steam-heated rollers.

7. A method as set forth in claim 2, further comprising the steps of:

supplying said heated glue to said glue pan from a heat exchanger; and recirculating said heated glue from said glue pan back to said heat exchanger.

8. A method as set forth in claim 6, further comprising:

disposing said preheater rollers in contact with said corrugated core sheet and said liner for heating the same by contact therewith, said heated roller for said corrugated core sheet being disposed upstream of said glue pan.

9. Apparatus for glueing corrugated board, comprising:

an enclosed, heat-insulating housing;

a glue pan disposed within said heat-insulating housing;

glue heating means for supplying heated glue to said glue pan disposed within said enclosed, heat-insulating housing;

means for feeding a corrugated core sheet and a liner through said enclosed, heat-insulating housing;

pre-heating means, disposed within said enclosed, heat-insulating housing at predetermined locations along the feed path of said corrugated core sheet and said liner, for pre-heating said corrugated core sheet and said liner and for generating waste heat which serves as the sole source of heat within said heat-insulating housing for heating the interior space of said enclosed, heat-insulating housing to a pre-determined temperature so as to maintain said corrugated core sheet and said liner, as well as said glue disposed within said glue pan, in a heated state;

means for applying said heated glue from said glue pan onto ridge portions of said corrugated core sheet; and means located outside and immediately downstream of said heat-insulating housing for bonding together said corrugated core sheet and said liner.

10. Apparatus as set forth in claim 9, wherein:

said pre-heating means comprise steam-heated rollers.

11. Apparatus as set forth in claim 9, wherein said glue heating means comprises:

a tank for holding a stock of said glue;

a first upper glue pool chamber into which said glue from said tank is deposited;

a second upper glue pool chamber, separated from said first upper glue pool chamber, from which said heated glue is discharged to said glue pan;

a lower glue pool chamber, vertically spaced below said first and second upper glue pool chambers, for transferring said glue from said first upper glue pool chamber to said second upper glue pool chamber;

a heat medium chamber, defined between said upper glue pool chambers and said lower glue pool chamber, for containing a heat medium;

a first set of vertically extending heat exchanger pipes, interposed between said first upper glue pool chamber and said lower glue pool chamber and extending through said heat medium chamber in a heat exchange relationship with said heat medium disposed within said heat medium chamber, for transforming said glue from said first upper glue pool chamber to said lower glue pool chamber;

a second set of vertically extending heat exchanger pipes, interposed between said lower glue pool chamber and said second upper glue pool chamber and extending through said heat medium chamber in a heat exchange relationship with said heat medium disposed within said heat medium chamber, for transferring said glue from said lower glue pool chamber to said second upper glue pool chamber;

a steam inlet feed pipe fluidically connected to said heat medium chamber for providing steam thereinto;

first conduit means for conducting said glue from said tank to said first upper glue pool chamber; and second conduit means for conducting said heated glue from said second upper glue pool chamber to said glue pan.

12. Apparatus as set forth in claim 11, further comprising:

third conduit means for conducting said heated glue from said glue pan back to said first upper glue pool chamber.

13. Apparatus as set forth in claim 11, further comprising:

pump means disposed within said lower glue pool chamber for transferring said glue from said first upper glue pool chamber to said second upper glue pool chamber.

14. Apparatus as set forth in claim 11, further comprising:

agitating means disposed within said heat medium chamber for stirring said heat medium so as to maintain the temperature thereof substantially uniform throughout said heat medium.

15. Apparatus for glueing corrugated board, comprising:

an enclosed, heat-insulating housing;

a glue pan disposed within said heat-insulating housing;

glue heating means for supplying heated glue to said glue pan disposed within said enclosed, heat-insulating housing;

means for feeding a corrugated core sheet and a liner through said enclosed, heat-insulating housing;

pre-heating means, disposed within said enclosed, heat-insulating housing at predetermined locations along the feed path of said corrugated core sheet and said liner, for pre-heating said corrugated core sheet and said liner, and for generating waste heat which serves as the sole source of heat within said enclosed heat-insulating housing for heating the interior space of said enclosed, heat-insulating housing to a pre-determined temperature so as to maintain said corrugated core sheet and said liner, as well as said glue disposed within said glue pan, in a heated state;

means for applying said heated glue from said glue pan onto ridge portions of said corrugated core sheet;

means located outside and downstream of said enclosed, heat-insulating housing for bonding together said corrugated core sheet and said liner; and means for supplying steam to said ridge portions of said corrugated core sheet, at a position immediately upstream of the location at which said corrugated core sheet is bonded to said liner, for heating said glue applied to said ridge portions of said corrugated core sheet so as to facilitate said bonding together of said corrugated core sheet and said liner.

16. Apparatus as set forth in claim 15, wherein said glue heating means comprises:

a tank for holding a stock of said glue;

a first upper glue pool chamber into which said glue from said tank is deposited;

a second upper glue pool chamber, separated from said first upper glue pool chamber, from which said heated glue is discharged to said glue pan;

a lower glue pool chamber, vertically spaced below said first and second upper glue pool chambers, for transferring said glue from said first upper glue pool chamber to said second upper glue pool chamber;

a heat medium chamber, defined between said upper glue pool chambers and said lower glue pool chamber, for containing a heat medium;

a first set of vertically extending heat exchanger pipes, interposed between said first upper glue pool chamber and said lower glue pool chamber and extending through said heat medium chamber in a heat exchange relationship with said heat medium disposed within said heat medium chamber, for transferring said glue from said first upper glue pool chamber to said lower glue pool chamber;

a second set of vertically extending heat exchanger pipes, interposed between said lower glue pool chamber and said second upper glue pool chamber and extending through said heat medium chamber is heat exchange relationship with said heat medium disposed within said heat medium chamber, for transferring said glue from said lower glue pool chamber to said second upper glue pool chamber;

a steam inlet feed pipe fluidically connected to said heat medium chamber for providing steam thereinto;

first conduit means for conducting said glue from said tank to said first upper glue pool chamber; and second conduit means for conducting said heated glue from said second upper glue pool chamber to said glue pan.

17. Apparatus as set forth in claim 15, wherein:

said steam supply means comprises at least one pipe extending transversely across the width of said corrugated core sheet and said liner, and having a plurality of holes defined therein from which said steam is exhausted toward said ridge portions of said corrugated core sheet.

18. Apparatus as set forth in claim 15, wherein:

said pre-heating means comprise steam-heated rollers.

19. Apparatus as set forth in claim 16, further comprising:

third conduit means for conducting said heated glue from said glue pan back to said first upper glue pool chamber.

20. Apparatus as set forth in claim 16, further comprising:

pump means disposed within said lower glue pool chamber for transferring said glue from said first upper glue pool chamber to said second upper glue pool chamber.

* * * * *